Dec. 19, 1961     C. S. SEMAR ET AL     3,013,838
FOLDING VEHICLE SEAT

Filed Aug. 17, 1960     2 Sheets-Sheet 1

INVENTORS
Claud S. Semar,
BY Karl A. Walter, &
Wilson H. West

C. P. Barnard
ATTORNEY

Dec. 19, 1961     C. S. SEMAR ET AL     3,013,838
FOLDING VEHICLE SEAT
Filed Aug. 17, 1960                    2 Sheets-Sheet 2
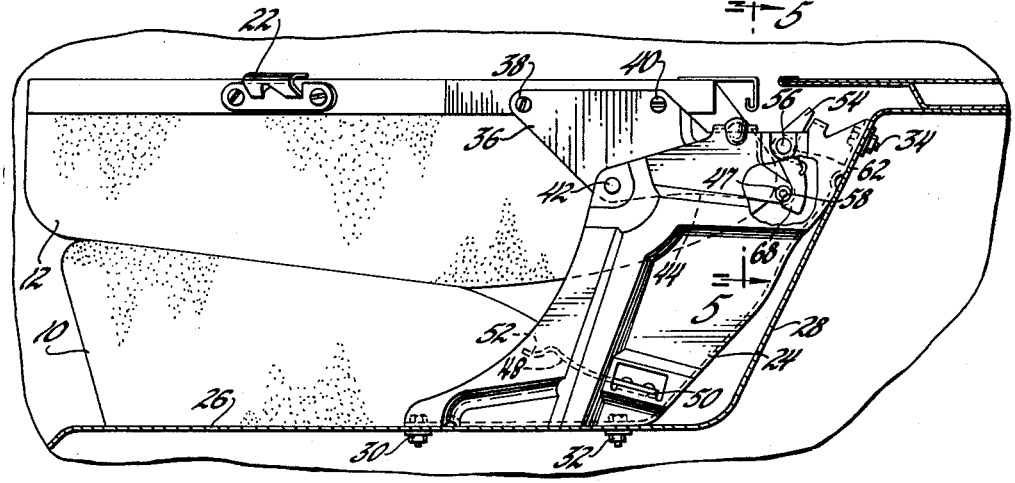
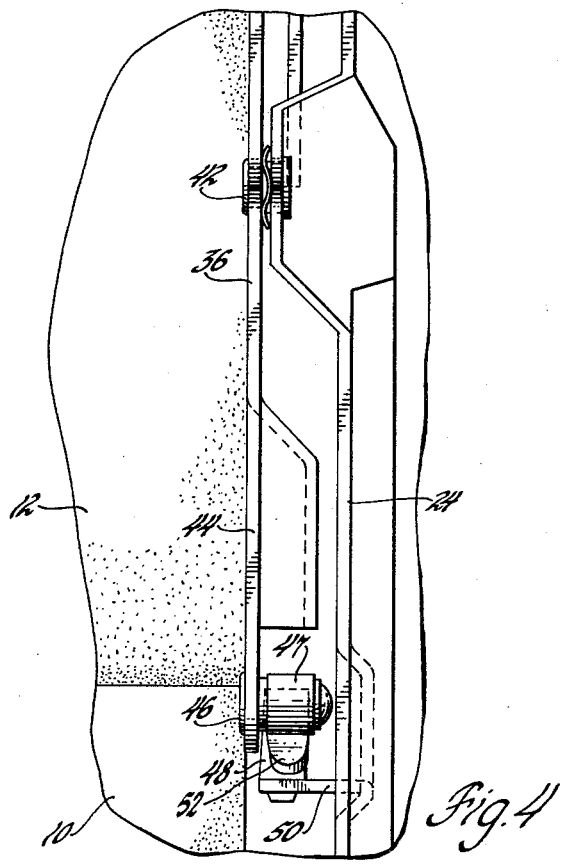
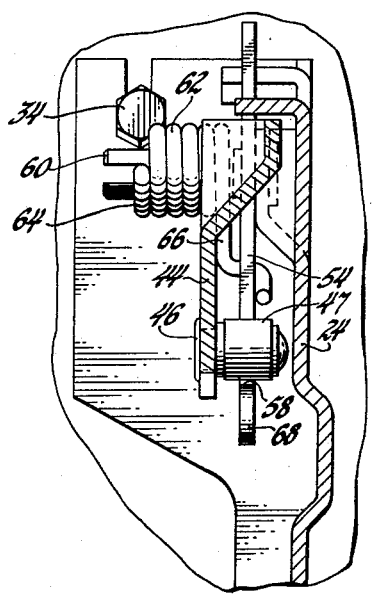
INVENTORS
Claud S. Semar,
BY Karl A. Walter, &
Wilson H. West
C. P. Barnard
ATTORNEY

United States Patent Office 3,013,838
Patented Dec. 19, 1961

3,013,838
FOLDING VEHICLE SEAT
Claud S. Semar, Birmingham, Karl A. Walter, Detroit, and Wilson H. West, Madison Heights, Mich., assignors to General Motors Corporation, Detroit, Mich., a corporation of Delaware
Filed Aug. 17, 1960, Ser. No. 50,164
9 Claims. (Cl. 296—66)

This invention relates to folding vehicle seats and more particularly to an integral pivotal link and latch mechanism for moving a folding vehicle seat between a seat forming position and a folded floor forming position.

Folding vehicle seats which are movable from a seat forming position to a floor forming position are commonly provided in vehicles of the station wagon type and in other vehicles where it is desired to provide means to form a load carrying platform. Folding seats of this type have commonly been provided with parallelogram linkage arrangements or the like having an over center construction or the like to retain the seat in the various positions.

An object of this invention is to provide an improved folding seat having simplified support means for causing movement of a vehicle seat from a folded floor forming position to an upright seat forming position. Another object of this invention is to provide improved latch mechanism for positively securing a vehicle seat in either a floor forming position or a seat forming position. Still another object of this invention is to incorporate latching mechanism with a simplified seat support mechanism to provide an integral pivot and latch mechanism for a folding seat structure. Other objects and advantages of the invention are disclosed in the following detailed description wherein reference is made to the accompanying drawing in which:

FIGURE 3 is a side elevational view of the apparatus shown in FIGURE 1 in a folded position;

FIGURE 4 is a sectional view taken along the line 4—4 in FIGURE 2; and

FIGURE 5 is a partial sectional view taken along the line 5—5 in FIGURE 3.

Figure 1:
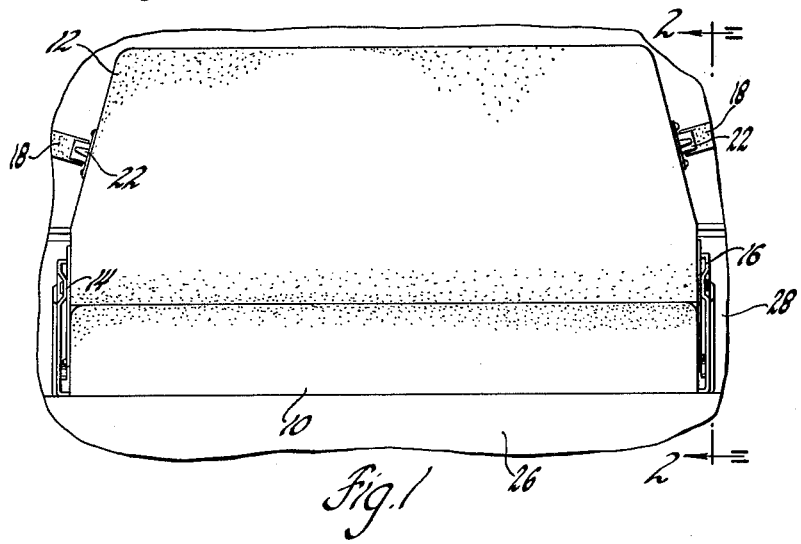
FIGURE 1 is a front view of a vehicle seat embodying the present invention.

Referring now to FIGURE 1, a vehicle seat assembly comprising a seat cushion 10 and a seat back 12 is shown in an upright seat forming position. A pair of spaced integral pivot and latch mechanisms 14, 16 pivotally support the seat back 12 for movement from the upright seat forming position to a folded floor forming position as shown in FIGURE 3. Cushioned stop members 18 are secured to a portion 20 of the vehicle body adjacent the seat back 12 and are adapted to engage flange members 22 fixed to the side of the seat back 12 to support the seat back in the seat forming position.

Figure 2:
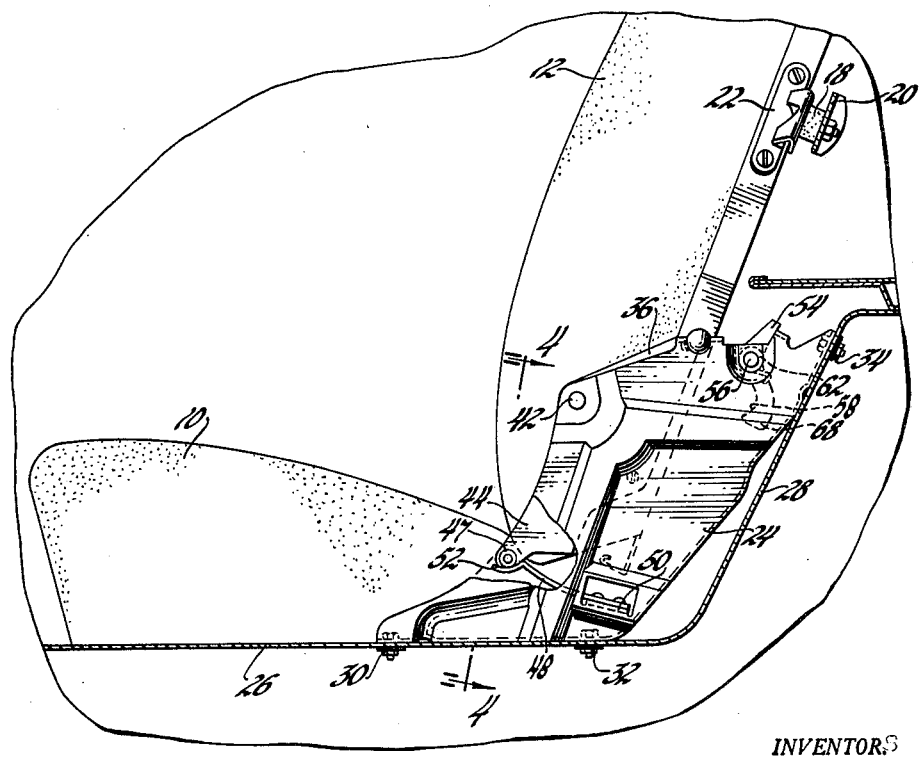
FIGURE 2 is a side elevational view, with parts broken away, taken along the line 2—2 in FIGURE 1.

Each of the integral pivot and latch mechanisms 14, 16 are identical and therefore only the support member 16 is described in detail. Referring now to FIGURES 2 and 3, the mechanism 16 comprises a support bracket 24 which is secured to the vehicle floor pan 26 and the adjoining transverse vertical wall pan 28 by suitable means such as bolt members 30, 32, 34. The support bracket may be entirely supported by the vehicle floor pan if necessary. The seat back 12 is pivotally mounted on the support bracket 24 by an arm 36 which is secured to the seat back frame by suitable fastening means 38, 40 and pivotally connected by a pin 42 to the bracket 24. The arm 36 is an elongated member having an end portion 44 extending outwardly beyond the pivotal connection 42. As shown in FIGURE 5, a pin 46 is secured to the end of the arm portion 44 and rotatably supports a roller member 47.

In order to secure the seat back 12 in the upright seat forming position, a flat spring plate 48 is secured to a lanced out flange portion 50 of the support bracket 24 by rivets or other suitable means. The flat spring 48 is provided with one or more indented detent portions 52 adapted to engage and seat the roller 47 when the seat back is in the seat forming position as shown in FIGURE 2. The seat back 12 is latched in the folded floor forming position, as shown in FIGURE 3, by a hook member 54 which is pivoted at 56 to the support bracket 24 and provided with a detent portion 58. The lower surface of the detent portion is provided with a cam contour for a purpose to be hereinafter described. The pivot 56 is formed by a stud 60 having a bifurcated end portion which supports a coil spring 62. One end 64 of the coil spring 62 is retained within the bifurcation of the stud 60 and the other end 66 is engaged with the hook 54 to bias the detent portion 58 of the hook forwardly into retaining engagement with the roller member 47. The lower end 68 of the hook 54 is contoured to provide a cam surface for engagement with the roller 47. Although another spring element such as the flat spring 48 might be substituted for the hook 54, the illustrated arrangement provides exceptionally good results. Other spring elements such as a clevis spring or the like could also be used.

In operation with the seat back 12 in the seat forming position shown in FIGURE 2, the roller 47 carried by the arm portion 44 is in abutting engagement with the detent portion 52 of the flat spring 48 and retained thereby from forward movement about the pivot 42. In order to move the seat back 12 from the seat forming position, a force must be exerted on the seat back to move the roller 47 upwardly and rearwardly out of engagement with the detent portion 52 of the flat spring. The position and tension of the spring determines the force necessary. A spring requiring approximately a forty or fifty pound force is satisfactory. When the seat back 12 is released it may be rotated forwardly and downwardly about the pivot 42 and into engagement with the seat cushion 10. The seat back 12 is depressed into the cushion 10 until the roller 47 engages the cam surface 68 of the hook 54 and forces the hook rearwardly and upwardly against the bias of the coil spring 60 to seat the roller 47 in the detent portion 58. After the seat back 12 has been moved into the floor forming position as shown in FIGURE 3 and the force applied to the seat back to cause rotation thereof is removed, the hook 54 is biased into latching engagement with the roller 47 to secure the seat back in the folded position. When the latching force is removed from the seat back, the interference between the seat cushion and the seat back cushion suitably tensions the roller 47 downwardly against the hook. Although any suitable spring force may be used, a coil spring requiring approximately forty or fifty pounds of force to move the hook rearwardly is satisfactory. When it is desired to move the seat back from the folded position to the upright position, sufficient force may be exerted upwardly on the seat back 12 to cam the hook 54 upwardly and rearwardly against the bias of the coil spring 60 by coaction of the roller 47 and the cam contoured lower surface of the detent portion. The roller 47 is moved forwardly and downwardly out of engagement with the detent portion 58. As the seat back 12 is rotated upwardly to the seat forming position, the roller 47 will again be engaged with the detent portion 52 of the flat spring 48 and the seat back will be secured in position abutting the bumpers 18 which are adapted to receive the flange stop 22 when the seat back is latched in the seat forming position.

It is to be noted that the apparatus provides a positive latching arrangement for the seat back in both the seat forming position and the floor forming position. Thus the flat spring 48 and the coil spring 60 are adapted to secure the seat back in the seat forming position and the floor forming position, respectively, until a predetermined force is applied to the seat back to cause movement thereof about the pivot 42. The construction of the spring members may be varied to retain the roller member 48 within the respective detent portions 52, 58 until a predetermined force is applied to the seat back.

It is contemplated that certain modifications and rearrangement of the parts are possible without the departing from the spirit and scope of this invention as defined by the appended claims.

The invention claimed is:

1. A folding vehicle seat mounted within a vehicle body and being movable from an upright seat forming position to a folded floor forming position, a support bracket fixedly secured to the vehicle floor, a seat back, a support arm supporting said seat back on said support bracket for pivotal movement from said upright seat forming position to said folded floor forming position, striker means fixed to said seat support arm back and being movable therewith from said upright seat forming position to said folded floor forming position, first resilient retaining means secured to the lower portion of said support bracket and adapted to cooperably engage and retain said striker means when said seat back is in said upright seat forming position and to restrain movement thereof, and second resilient retaining means secured to the upper portion of said bracket and adapted to cooperably engage and retain said striker means when said seat back is in said folded floor forming position to restrain movement of said seat back from said floor forming position.

2. A folding vehicle seat mounted within a vehicle body and being movable from an upright seat forming position to a folded floor forming position, a support bracket fixedly secured to the vehicle floor, a seat back, pivotal means supporting said seat back on said support bracket for pivotal movement from said upright seat forming position to said folded floor forming position, latch means fixed to said seat back and being movable therewith from said upright seat forming position to said folded floor forming position, first retaining means secured to the lower portion of said support bracket and adapted to cooperably engage and retain said latching means when said seat back is in said upright seat forming position and to restrain movement thereof, and second retaining means secured to the upper portion of said bracket and adapted to cooperably engage and retain said latching means when said seat back is in said folded floor forming position to restrain movement of said seat back from said floor forming position.

3. The apparatus as defined in claim 2 and wherein said latching means comprises an arm fixedly secured to said seat back, said pivotal means interconnecting said arm and said bracket for movement of said seat back thereabout from said upright seat forming position to said folded floor forming position, a portion of said arm extending outwardly from said pivotal connection, a pin member fixed to said portion of said arm, and a roller member rotatably supported on said pin member, for engagement with said first and second retaining means.

4. The apparatus as defined in claim 2 and wherein said first retaining means comprises a flat spring secured to said bracket member, said flat spring having a detent portion adapted to receive and retain said latching means when said seat back is in said folded seat forming position.

5. The apparatus as defined in claim 2 and wherein said first retaining means comprises a spring means secured to said bracket member, said spring means having a recess adapted to receive and retain said latching means when said seat back is in said folded seat forming position.

6. The apparatus as defined in claim 2 and wherein said second retaining means comprises a hook member, said hook member being pivotally secured to the upper portion of said support bracket, a spring means fastened to said hook member and biasing said hook member forwardly and upwardly, a detent portion formed on one end of said hook member and being adapted to engage said latching means when said seat back is in said floor forming position.

7. The apparatus as defined in claim 6 and wherein the lower surface of said detent portion is provided with a cam surface, and the lower surface of said end of said hook member having a cam surface to control movement of said latching means in and out of said detent portion.

8. In a vehicle seat comprising a seat cushion and a seat back, said seat cushion being movable from a seat forming position to a floor forming position about support means comprising a bracket fixed to the vehicle floor, an arm secured to said seat back and extending downwardly therealong, a pivotal connection between said arm and said bracket for pivotally supporting said seat back, a portion of said arm extending downwardly beyond said pivotal connection, striker means fixed to said portion of said arm, a plate spring fixed to said bracket and extending forwardly therealong, a detent portion formed on said plate spring and adapted to receive and retain said striker means when said seat back is in said seat forming position, a hook member pivotally secured to said bracket member at a point spaced upwardly and rearwardly of said plate spring, spring means biasing said hook member upwardly and forwardly, and a detent portion provided on said hook means to receive and retain said striker means when said seat back is in said floor forming position.

9. In a vehicle seat comprising a seat cushion and a seat back, said seat cushion being movable from a seat forming position to a floor forming position about support means comprising a bracket fixed to the vehicle floor, an arm secured to said seat back and extending downwardly there along, a pivotal connection between said arm and said bracket for pivotally supporting said seat back, a portion of said arm extending downwardly beyond said pivotal connection, striker means fixed to said portion of said arm, a portion of said bracket adjacent the vehicle floor being lanced out to provide a support flange, lower spring means fixed to the lower portion of said support flange and extending forwardly thereof, detent means provided by said lower spring means and adapted to receive and retain said striker means when said seat back is in said seat forming position, upper spring means secured to said bracket member at a point spaced upwardly and rearwardly of said plate spring, and detent means provided by said upper spring means to receive and retain said striker means when said seat back is in said floor forming position.

References Cited in the file of this patent
UNITED STATES PATENTS

| 1,747,329 | Smith | Feb. 18, 1930 |
| 2,602,691 | Doty | July 8, 1952 |
| 2,634,429 | Dopeman | Apr. 14, 1953 |